United States Patent [19]

Brekke

[11] Patent Number: 5,009,680
[45] Date of Patent: Apr. 23, 1991

[54] METHOD AND A SYSTEM FOR SEPARATING AND TRANSPORTING GAS AND LIQUID

[75] Inventor: Kristian Brekke, Oslo, Norway

[73] Assignee: Aker Engineering a.s., Oslo, Norway

[21] Appl. No.: 488,061

[22] PCT Filed: Nov. 28, 1989

[86] PCT No.: PCT/NO89/00123
§ 371 Date: Jun. 11, 1990
§ 102(e) Date: Jun. 11, 1990

[87] PCT Pub. No.: WO90/06472
PCT Pub. Date: Jun. 14, 1990

[30] Foreign Application Priority Data

Nov. 28, 1988 [NO] Norway ................................ 885302
Mar. 17, 1989 [NO] Norway ................................ 891194

[51] Int. Cl.⁵ ............................................. B01D 19/00
[52] U.S. Cl. ............................................. 55/40; 55/43; 55/189
[58] Field of Search .................... 55/40, 43, 46, 55, 189

[56] References Cited

U.S. PATENT DOCUMENTS 4,561,866 12/1985 Altmann et al. ................ 55/189 X
4,778,443 10/1988 Sands et al. ...................... 55/43 X Primary Examiner—Charles Hart
Attorney, Agent, or Firm—Hedman, Gibson, Costigan & Hoare

[57] ABSTRACT

A method and a system are disclosed for the transportation and separation of gas from liquid and solid media in one or several stages in a manner so that the pressure in the gaseous phase from an early separator stage (1) or from another gas deposit is utilized for the transportation of the fluids produced in subsequent separator stages (2, 3, 4). Gas which is separated at high pressure in an early separator stage (1) or gas from another gas deposit is fed into a separator (3) which has effected separation at a lower pressure and the high pressure gas forces out the separated fluid which is present in the separator receiving the high pressure gas. The separator stage at which high pressure gas is received from a preceding stage or another gas source, is made up of several identical separators (2, 3, 4) which alternate in carrying out the separation phase (2), output (3) and decompression (4) so that there is at all times one separator carrying out functions within one phase.

6 Claims, 1 Drawing Sheet

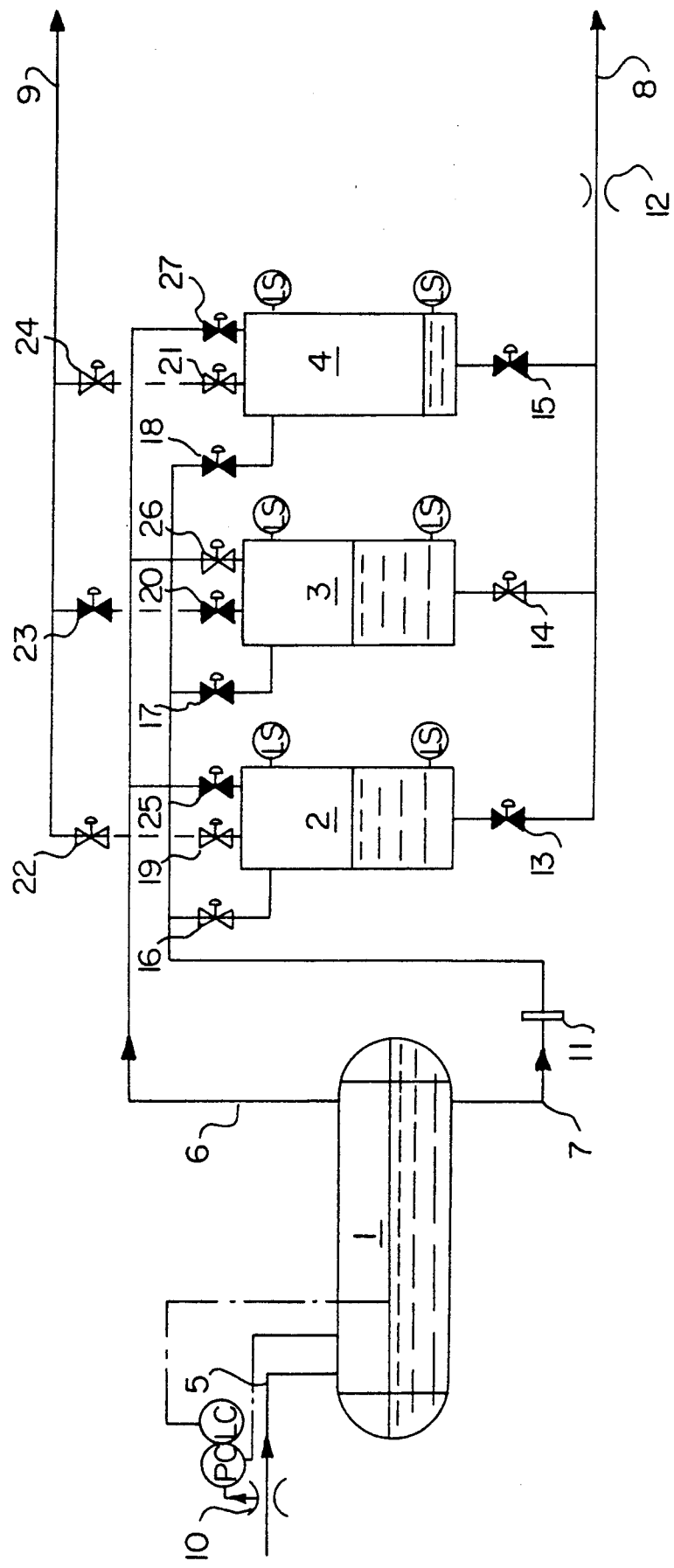

METHOD AND A SYSTEM FOR SEPARATING AND TRANSPORTING GAS AND LIQUID

This invention relates generally to a process and separator system for the separation of gas from liquid and solid media and the conveyance of the gas and liquid without the addition of energy to the separation process utilized.

An object of the invention is to be able to retain a substantial portion of the conveyance energy or transportation pressure throughout the separating process.

The accompanying drawing schematically illustrates an embodiment of the invention.

According to the present invention a process for the transportation of gas and liquid or solid media and the separation of gas from liquid or solid media in a manner so that the pressure in the gas separated off in one separator stage is used for the transportation of separated fluids from a subsequent separator stage, comprising the steps of separating gas off at high pressure in one separator stage or adding it from another gas source and directing said separated or added gas into a separator containing fluid from which gas has been separated at a lower pressure, said higher pressure gas forcing out already separated fluid present in the separator receiving said high pressure gas.

The example of the present invention described herein is a two-stage process, in which the oil and gas are the separated phases and in which no water is separated off and in which there is only one line for removing gas from the process and one line for removing oil.

The separator transportation system of the present invention may be situated, for example, immediately downstream of an oil/gas well or a transportation line.

The process carried out with the separator transportation system has at least one separation stage. If the process includes two or more separation stages, then in the first stage, the contents of high pressure separator 1 will be in a steady state of separation of gas and water, if any, from the oil at a high pressure (approximately equal to the starting pressure in the transport line 8 mentioned hereinafter for stabilized oil). Any water separated off may be fed out of the high pressure separator 1 together with any sand produced via a water transportation line. Any gas from the high pressure separator 1 is fed to separators of a second stage 2, 3, 4 for the purpose of forcing the already stabilized oil from separators of the second stage 2, 3, 4 into the oil transportation line 8.

Separation in the second stage, hereinafter referred to as the low pressure separator cycle, is effected by several identical separators 2, 3, 4 which work in three phases. The separators 2, 3, 4 alternate in carrying out these three phases so that there is at all times one separator carrying out one of the phases.

Phase 1 (Separation)

Gas is separated from oil at the same time as gas is removed at a pressure (necessary transportation pressure for exported gas) lower than that in the preceding separator. For separator 2 to separate gas from oil, the oil inlet valve 16 of the separator is open, its gas inlet valve 25 is closed, its oil output valve 13 is closed, and its gas outlet valve 19 is open. A compression unit may optionally be installed ahead of the export facilities for the separated gas.

Phase 2 (Transportation)

Oil is transported at a high pressure which is in part determined by the necessary transportation pressure for exported oil. For separator 3 to remove oil, the oil inlet valve 17 of the separator is closed, its gas inlet valve 26 is open, its oil outlet valve 14 is open, and its gas outlet valve 20 is closed. Mechanical devices may optionally be installed to reduce the contact surface area of gas and oil.

Phase 3 (Decompression)

The separator 4 is decompressed by exhausting gas at a constant mass flow through the decompression valve 24, either to a dedicated gas transportation line or to the same transportation line 9 as is used for gas separated off in Phase 1, For a separator in the low pressure separator cycle to decompress gas to the gas export line, its oil inlet valve 18, gas inlet valve 27 and oil outlet valve 15 are closed, while its gas outlet valve 21 and decompression valve 24 are open.

The number of separators in the low pressure separator cycle is determined by the ratio between the times spent by the separators 2, 3, 4 in carrying out the three different phases. This example is based on three being the necessary number of separators.

One of the separators 2, 3, 4 in the low pressure separator cycle outputs oil at any given time, while another is in the process of decompressing and a third one is separating.

All separators 2, 3, 4 of the low pressure separator cycle are connected to the oil supply line 7 and the gas supply line 6 from high pressure separator 1 or possibly direct from oil or gas wells if the first stage or high pressure separator 1 is waived.

The separators 2, 3, 4 of the low pressure separator cycle are connected to output lines 8, 9 both for oil and gas. All these lines are fitted with shut-off valves which are controlled, for example by a computer, on the basis of the levels of liquid in the low pressure separator cycle, as well as mass and balance of energy in the separator process. For the control of pressure and rates of flow, adjustment valves 10, 11 are fitted to the oil output line 8, the inlet for oil to the low presssure separator cycle, and any inlet for oil to the high pressure separator.

The transportation pressure which it is possible to maintain at the same time as the desired flow volume is maintained for output oil, is mainly determined by the composition of the liquid and gas being separated. The larger the proportion of light components (gas components), the higher is the pressure which it is possible to maintain for output of oil.

I claim:

1. A process for the transportation of gas and liquid or solid media and the separation of gas from liquid or solid media in a manner so that the pressure in the gas separated off in one separator stage is used for the transportation of separated fluids from a subsequent separator stage, comprises the steps of:
   (a) separating gas off at high pressure in one separator stage or adding it from another gas source and
   (b) directing said separated or added gas into a separator containing fluid from which gas has been separated at a lower pressure;
   (c) said high pressure gas forcing out already separated fluid present in the separator receiving said high pressure gas.

2. A process as claimed in claim 1, wherein the lower pressure separator comprises a plurality of substantially identical separators, each of said separators operating in a work cycle and alternating in carrying out in the sequence indicated, the function phases of said process, said process being such as to ensure that one separator carries out its functions within one phase.

3. A process as claimed in claim 1 or 2, wherein
   (a) phase 1 of the process is the separation of gas from liquid at a pressure necessary to maintain export of gas from the process;
   (b) phase 2 is the output of liquid from the separator to an output line by gas from a preceding separator stage or from another gas deposit being fed into the separator; and
   (c) phase 3 is decompressing the separator by directing gas from it to a gas output line.

4. A process as claimed in claim 1, wherein separators in the separator stage which receives said higher pressure gas are decompressed at constant mass flow of gas through a decompression valve to a gas output line after completion of the phase for transportation of oil, the separators being decompressed sequentially.

5. A system for the separation and transportation of gas and liquid, comprising first separator means (1) for separation of gas from the liquid at a first pressure, and second separator means (2, 3, 4) for separation at a lower pressure than said first pressure and for separation of further gas from the liquid to be separated out in said first separator means (1), said second separator means including at least one separator vessel (2), the upper part of said vessel (2) being connected to said separator means (1) through gas and liquid supply lines (6, resp. 7) and being further connected to a gas transportation line (9), the lower part of said vessel (2) being connected to a liquid transportation line (8).

6. A system according to claim 5, wherein said second separator means includes at least three separator vessels (2, 3, 4) connected in parallel.

* * * * *